(12) United States Patent
Woo et al.

(10) Patent No.: US 10,997,155 B2
(45) Date of Patent: May 4, 2021

(54) DATA CLASSIFICATION APPARATUS, VEHICLE INCLUDING THE SAME, AND CONTROL METHOD OF THE SAME

(71) Applicants: HYUNDAI MOTOR COMPANY, Seoul (KR); KIA MOTORS CORPORATION, Seoul (KR)

(72) Inventors: Seunghyun Woo, Seoul (KR); Gi Beom Hong, Seoul (KR); Daeyun An, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 292 days.

(21) Appl. No.: 16/192,284

(22) Filed: Nov. 15, 2018

(65) Prior Publication Data
US 2019/0325049 A1 Oct. 24, 2019

(30) Foreign Application Priority Data
Apr. 19, 2018 (KR) ........................ 10-2018-0045364

(51) Int. Cl.
*G06F 16/23* (2019.01)
*G06F 16/28* (2019.01)
*G06F 16/22* (2019.01)

(52) U.S. Cl.
CPC ...... *G06F 16/2365* (2019.01); *G06F 16/2228* (2019.01); *G06F 16/285* (2019.01)

(58) Field of Classification Search
CPC . G06F 16/285; G06F 16/2228; G06F 16/2365

USPC .......................................................... 707/608
See application file for complete search history.

(56) References Cited

U.S. PATENT DOCUMENTS

| 5,918,222 A | * | 6/1999 | Fukui ...................... G06Q 10/10 |
| 2009/0043428 A1 | * | 2/2009 | Matsunaga ......... B60W 40/107 701/1 |
| 2009/0313019 A1 | * | 12/2009 | Kato ....................... G10L 17/26 704/254 |
| 2010/0211966 A1 | * | 8/2010 | Zhang ................ H04N 21/4223 725/10 |
| 2017/0221149 A1 | * | 8/2017 | Hsu-Hoffman ........ G06Q 40/08 |

FOREIGN PATENT DOCUMENTS

| JP | 2015-110417 A | 6/2015 |
| JP | 2015-128989 A | 7/2015 |
| JP | 2015-130178 A | 7/2015 |
| KR | 10-1025510 | 4/2011 |
| KR | 10-2013-0023535 A | 3/2013 |
| KR | 10-2014-0080727 A | 7/2014 |
| KR | 10-2017-0018696 A | 2/2017 |

* cited by examiner

*Primary Examiner* — James Trujillo
*Assistant Examiner* — Fariborz Khoshnoodi
(74) *Attorney, Agent, or Firm* — Morgan, Lewis & Bockius LLP

(57) ABSTRACT

A data classification apparatus capable of quickly determining an emotion of a driver includes an input device in which a target emotion and an accuracy expectation value of the target emotion are inputted, and a controller rearranging a pre-stored data structure based on the target emotion and the accuracy expectation value of the target emotion, wherein the controller rearranges the data structure so that an accuracy value of the target emotion is secured as much as the accuracy expectation value.

14 Claims, 7 Drawing Sheets

DATA CLASSIFICATION APPARATUS, VEHICLE INCLUDING THE SAME, AND CONTROL METHOD OF THE SAME

CROSS-REFERENCE TO RELATED APPLICATION(S)

This application is based on and claims the benefit of priority under 35 U.S.C. § 119 to Korean Patent Application No. 10-2018-0045364, filed on Apr. 19, 2018 in the Korean Intellectual Property Office, the disclosure of which is incorporated by reference herein in its entirety.

TECHNICAL FIELD

The present disclosure relates to a data classification apparatus, a vehicle including the same, and a control method of the same.

BACKGROUND

In modern society, automobiles are the most common means of transportation and the number of people using them is increasing. Owing to the development of automobile technology, there are many changes in life such as easy movement over long distances and convenience of life.

In recent years, techniques have been developing to determine a driver's emotion and to increase the driver's convenience in accordance with the driver's emotion. In addition, technologies using biometrics have been developing to determine a driver's emotion.

Biometrics recognizes part of a person's body to perform emotion determination, such as voice recognition, face recognition, hand gesture recognition, and heartbeat recognition. Since biometrics uses a unique part of a person's body that changes according to emotions, biometrics is highly accurate in determining emotions, and thus many studies have been conducted on biometrics.

SUMMARY

It is an aspect of the present disclosure to provide a data classification apparatus, a vehicle including the same, and a control method thereof that rearrange a data structure so that an emotion determination of a driver can be performed quickly.

Additional aspects of the present disclosure will be set forth in part in the description which follows and, in part, will be obvious from the description, or may be learned by practice of the disclosure.

As a means for solving the above-mentioned problems, a data classification apparatus according to one aspect of the present disclosure may comprise: an input device in which a target emotion and an accuracy expectation value of the target emotion are inputted; and a controller rearranging a pre stored data structure based on the target emotion and the accuracy expectation value of the target emotion, wherein the controller may include at least one processor and at least one non-transitory memory storing software instructions executed by the at least one processor, and the controller may rearrange the data structure so that an accuracy value of the target emotion is secured as much as the accuracy expectation value.

The controller may determine a minimum step of the data structure satisfying the accuracy expectation value of the target emotion and rearranges the data structure based on the minimum step.

The input device may receive a plurality of target emotions and an accuracy expectation value of each of the target emotions, and the controller may determine a minimum step of the data structure satisfying the accuracy expectation values of the plurality of target emotions and rearrange the data structure based on the minimum step.

The controller may delete a feature point of the data structure existing at the minimum step and existing after the minimum step and an emotion value of the data structure existing after the minimum step, and select a representative emotion value of the deleted feature point of the minimum step.

The controller may determine accuracy values of one or more routes proceeding to the target emotion in the data structure and rearrange the data structure based on a minimum step of the route in which the accuracy value is equal to or greater than the accuracy expectation value among the one or more routes.

The controller may determine an accuracy value of a plurality of routes proceeding to the target emotion in the data structure, respectively, determine a minimum step necessary for proceeding to a plurality of routes to the target emotion in which the sum of the accuracy values is equal to or greater than the accuracy expectation value, and rearrange the data structure based on the minimum step.

In order to select the representative emotion value, the controller may determine one or more emotion values branched from the feature point of the deleted minimum step, calculate the accuracy values of the routes proceeding to the respective emotion values, respectively, and select the emotion value proceeding to the route having the largest calculated accuracy value as the representative emotion value.

The data classification apparatus may further comprise a display device displaying the rearranged data structure.

A vehicle according to another aspect of the present disclosure may comprise: a biometric device in which biometric information of a driver is inputted; and a data classification apparatus including an input device in which a target emotion and an accuracy expectation value of the target emotion are inputted, and a controller which rearranges a pre-stored data structure based on the target emotion and the accuracy expectation value of the target emotion, wherein the controller may include at least one processor and at least one non-transistory memory storing software instructions executed by the at least one processor, and the controller may rearrange the data structure so that the accuracy value of the target emotion is secured as much as the accuracy expectation value, and determine the emotion of the driver corresponding to the biometric information using the rearranged data structure.

The controller may determine a minimum step of the data structure satisfying the accuracy expectation value of the target emotion and rearrange the data structure based on the minimum step.

The controller may receive a plurality of target emotions and an accuracy expectation value of each of the target emotions, determine a minimum step of the data structure satisfying the accuracy expectation values of the plurality of target emotions, and rearrange the data structure based on the minimum step.

The controller may delete a feature point of the data structure existing at the minimum step and existing after the minimum step and an emotion value of the data structure existing after the minimum step, and select a representative emotion value of the deleted feature point of the minimum step.

The controller may determine accuracy values of one or more routes proceeding to the target emotion in the data structure, and rearrange the data structure based on a minimum step of the route in which the accuracy value is equal to or greater than the accuracy expectation value among the one or more routes.

The controller may determine an accuracy value of a plurality of routes proceeding to the target emotion in the data structure, respectively, determine a minimum step necessary for proceeding to a plurality of routes to the target emotion in which the sum of the accuracy values is equal to or greater than the accuracy expectation value, and rearrange the data structure based on the minimum step.

In order to select the representative emotion value, the controller may determine one or more emotion values branched from the feature point of the deleted minimum step, calculate the accuracy values of the routes proceeding to the respective emotion values, respectively, and select the emotion value proceeding to the route having the largest calculated accuracy value as the representative emotion value.

The vehicle may further comprise a display device displaying the rearranged data structure.

A control method of a data classification apparatus according to another aspect of the present disclosure may comprise: receiving, by an input device, a target emotion and an accuracy expectation value of the target emotion; and rearranging, by a controller, a pre-stored data structure based on the target emotion and the accuracy expectation value of the target emotion, wherein the controller may include at least one processor and at least one non-transitory memory storing software instructions executed by the at least one processor, and the step of rearranging the data structure may rearrange the data structure so that an accuracy value of the target emotion is secured as much as the accuracy expectation value.

The step of rearranging the data structure may determine a minimum step of the data structure satisfying the accuracy expectation value of the target emotion and rearrange the data structure based on the minimum step.

The step of rearranging the data structure may delete a feature point of the data structure existing at the minimum step and existing after the minimum step and an emotion value of the data structure existing after the minimum step, and select a representative emotion value of the deleted feature point of the minimum step.

The step of rearranging the data structure may determine accuracy values of one or more routes proceeding to the target emotion in the data structure and rearrange the data structure based on a minimum step of the route in which the accuracy value is equal to or greater than the accuracy expectation value among the one or more routes.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
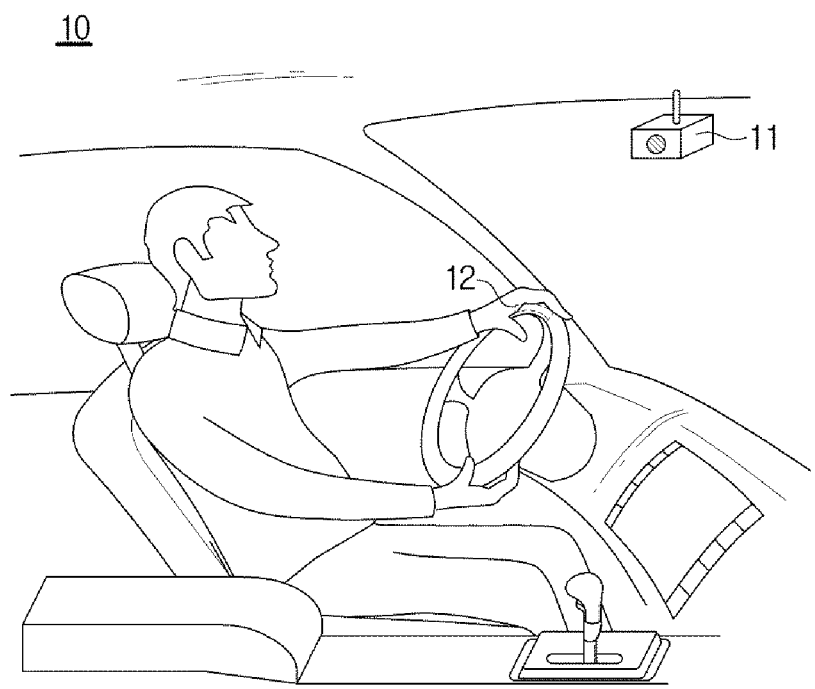
FIG. 1 is an interior view of a vehicle according to an embodiment of the present disclosure.

Like reference numerals refer to like elements throughout the specification. This specification does not describe all the elements of the embodiments, and duplicative contents between general contents or embodiments in the technical field of the present invention will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an dement, it means that the element may further include other dements, not excluding the other elements unless specifically stated otherwise.

Throughout the specification, when it is described that a member is located "on" another member, this includes not only when a member is in contact with another member, but also when there is another member between the two members.

The terms 'first,' 'second,' etc. are used to distinguish one dement from another element, and the dements are not limited by the above-mentioned terms.

The singular forms "a," "an," and "the" include plural referents unless the context clearly dictates otherwise.

Hereinafter, the working principle and embodiments of the present disclosure will be described with reference to the accompanying drawings.

FIG. 1 is an interior view of a vehicle according to an embodiment of the present disclosure.

Referring to FIG. 1, a variety of biometric devices may be provided in a vehicle 10 to determine the emotions of a driver on board a vehicle. As the biometric devices, a camera 11 for recognizing a face or hand motion of a driver, an electrode 12 for measuring a heartbeat, a microphone (not shown) for performing voice recognition, and the like may be included, but means for biometric recognition is not necessarily limited thereto.

The biometric information obtained through the biometric devices is provided to a data classification apparatus, and the data classification apparatus is used to determine emotions based on a pre-stored data structure.

Figure 2:
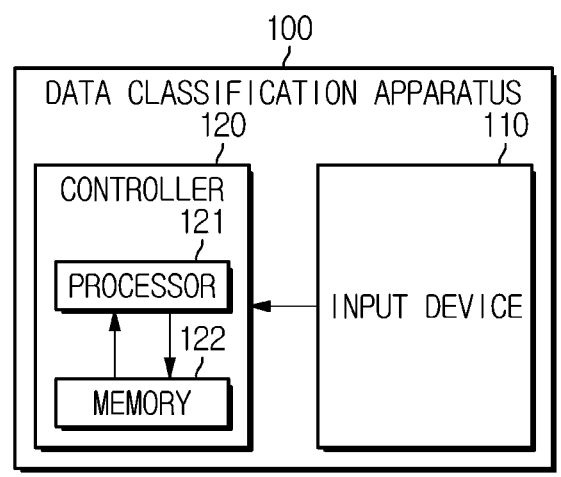
FIG. 2 is a control block diagram of a data classification apparatus according to an embodiment of the present disclosure.

FIG. 2 is a control block diagram of a data classification apparatus according to an embodiment of the present disclosure.

The data classification apparatus 100 extracts a feature point of the biometric information provided from the biometric devices of the vehicle 10 described above and derives a driver's emotion corresponding to the extracted feature point value. The feature point of the biometric information means a feature point of the data structure pre-stored in the data classification apparatus 100.

The data classification apparatus 100 according to an embodiment of the present disclosure includes an input device 110 and a controller 120, and may further include the above-described biometric devices as a biometric unit (not shown) according to an implemented form.

The input device 110 may receive a setting value for rearranging the data structure from a user or the controller 120. For example, the input device 110 may receive a target emotion and an accuracy expectation value of the target emotion from the user. Herein, the user is a person who is to set the data structure stored in the data classification apparatus 100, and may be various people such as a designer, a repairer, a driver, and the like of the data classification apparatus 100. As another example, the input device 110 may receive the generated target emotion and the accuracy expectation value of the target emotion from the controller 120 which generates the target emotion and the accuracy expectation value of the target emotion itself based on the performance of the hardware. It is also possible that either the target emotion or the accuracy expectation value of the target emotion is received from the user and the other is received from the controller 120.

The target emotion will be described later.

The input device 110 is provided in the vehicle 10 and includes hardware devices for user input such as various buttons or switches, a pedal, a keyboard, a mouse, a trackball, various levers, a handle, and a stick.

Further, the input device 110 may include a graphical user interface (GUI) such as a touch pad or the like for user input, that is, a software device. The touch pad may be implemented as a touch screen panel (TSP) to form a mutual layer structure with a display device.

In addition, the input device 110 may employ various methods such as a remote control device and a portable device for receiving a command of a user in a wire/wireless communication manner.

The controller 120 stores the data structure, rearranges the stored data structure according to the input of the setting value of the user, and derives the emotion of the driver corresponding to the driver's biometric information based on the rearranged data structure.

To this end, the controller 120 may be implemented as a memory 122 that stores an algorithm for controlling the operation of components in the data classification apparatus 100 or data for a program that reproduces the algorithm and a processor 121 (e.g., a CPU) that performs the above-described operation using data stored in the memory 122. The memory 122 and the processor 121 may be implemented as separate chips. Alternatively, the memory 122 and the processor 121 may be implemented as a single chip.

The memory 122 may be implemented as at least one of a nonvolatile memory device such as a cache, a read only memory (ROM), a programmable ROM (PROM), an erasable programmable ROM (EPROM), an electrically erasable programmable ROM (EEPROM), and a flash memory, a volatile memory device such as a random access memory (RAM), and a storage medium such as a hard disk drive (HDD) or a CD-ROM, but is not limited thereto.

The biometric unit which is for acquiring the biometric information of a driver may be the biometric devices described with reference to FIG. 1. The biometric unit not only may be included in the data classification apparatus 100 and may directly transmit various biometric information values to the controller 120, but may also be provided outside the data classification apparatus 100 and may transmit the biometric information value to the controller 120 of the data classification apparatus 100 through a wired/wireless communication network.

Hereinafter, a method of rearranging the data structure in which the data classification apparatus 100 according to an embodiment of the present disclosure is stored will be described with reference to FIGS. 3 to 6.

Figure 3:
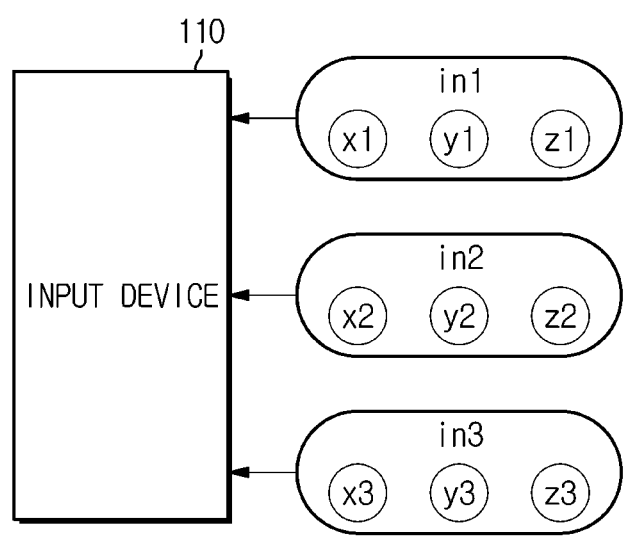
FIG. 3 is a conceptual diagram showing a grouping of biometric information values input to the data classification apparatus.

FIG. 3 is a conceptual diagram showing a grouping of biometric information values input to the data classification apparatus.

Referring to FIG. 3, when the controller 120 of the data classification apparatus 100 acquires a plurality of biometric information values (x, y, z) one or more times through a biometric device, assuming that a group of the plurality of biometric information values obtained by each measurement time is referred to as a biometric information group (in), the plurality of biometric information values (x, y, z) included in each biometric information group (in) may be the same or values obtained by another biometric device.

Since the biometric information may appear differently depending on a measurement time point or a person, even if each of groups (in1, in2, and in3) has acquired biometric information values (x1, y1, z1; x2, y2, z2; x3, y3, z3) using one or more identical biometric devices, the biometric information values (x1, x2, and x3; y1, y2, and y3; z1, z2, and z3) obtained using any one biometric device among the groups (in1, in2, and in3) may be different from each other.

For example, in a case where a camera and a microphone are provided as biometric devices, and the facial image of a driver by the camera, the voice tone by the microphone, and the pupil image by the camera are acquired as the biometric information, the controller 120 may receive the facial image data (x1), the voice data (y1), and the pupil image data (z1) for the first group (in1), may receive the facial image data (x2), the voice data (y2), and the pupil image data (z2) for the first group (in2), and may receive the facial image data (x3), the voice data (y3), and the pupil image data (z3) for the first group (in3).

Since the facial image data, voice data, and pupil image data differ according to the measurement time or driver, the facial image data (x1, x2, and x3) may be different from each other, the voice data (y1, y2, and y3) may be different from each other, and the pupil image data (z1, z2, and z3) may be different from each other.

Figure 4:
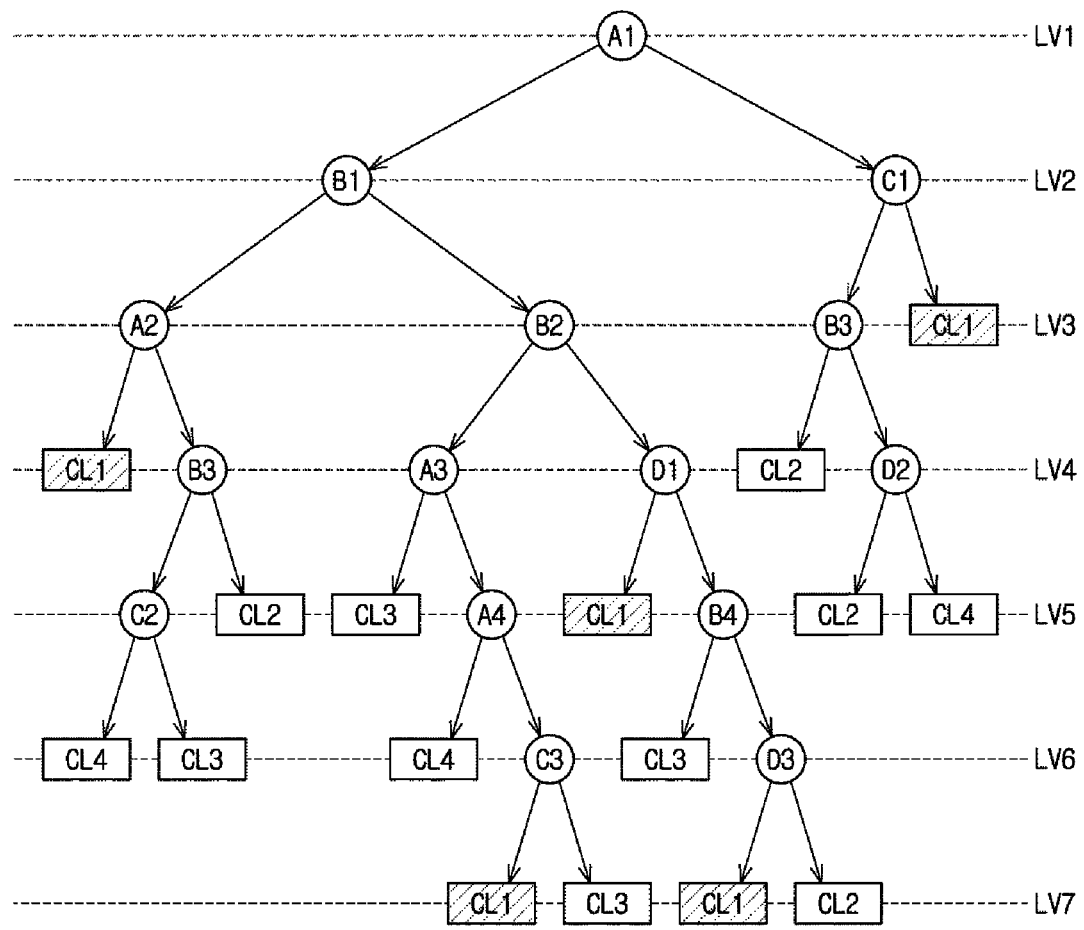
FIG. 4 is an exemplary diagram of a data structure stored in the data classification apparatus.

The controller 120 extracts a feature point of the driver's biometric information obtained based on the pre-stored data structure and derives the emotion result value of the driver corresponding to the feature value, FIG. 4 is an exemplary diagram of a data structure stored in the data classification apparatus.

As shown in FIG. 4, a data structure or a tree including one or more feature points (A1-A4, B1-B4, C1-C3 and D1-D3) is stored in the data classification apparatus 100.

Herein, each of the feature points (A1-A4, B1-B4, C1-C3, and D1-D3) is a classification criterion of biometric information stored in advance in the data structure. For example, such as whether the size of the pupil is greater than 5 mm, whether the corner of the mouth is raised, whether the voice tone is high, whether the voice is trembling, whether the head is nodded, or whether the heart rate has become faster, various values according to the settings may be stored in the data structure as feature points.

When any one biometric information group (in) is acquired, the controller 120 may determine the emotion of the driver based on one or more biometric information values included in the any one biometric information group (in).

To this end, the controller 120 may classify the biometric information values included in the biometric information group (in) according to the feature points of the pre-stored data structure, and may determine the driver's emotion by combining the classification result values of the biometric information values. In this case, the controller 120 may classify the biometric information values stepwise according to the feature points.

For example, in a case where the feature point A1 determined in a first step Lv1 shown in FIG. 4 indicates whether or not the voice tone is high, if it is determined that the voice tone is high, the process may proceed to the feature point B1 of a next step Lv2, and if it is determined that the voice tone is not high, the process may proceed to the feature point C1 of the next step Lv2. Further, in a case where the feature point B1 indicates whether or not the head of the driver is nodded, if it is determined that the head is nodded in the state of progressing to the feature point B1, the process may proceed to the feature point B2 of a next step Lv3, and if it is determined that the head is not nodded in the state of progressing to the feature point B1, the process may proceed to the feature point A2 of the next step Lv3.

Further, in a case where the feature point A2 indicates whether or not the voice is trembling, if it is determined that the voice is trembling in the state of progressing to the feature point A2, it is determined at a next step Lv4 that the driver's emotion is "anger CL1", and the process is terminated. However, if it is determined that the voice is not trembling in the state of progressing to the feature point A2, the process may proceed to the feature point B3 of the next step Lv4.

In a case where the feature point B3 indicates whether or not the mouth size is greater than 10 cm, if it is determined that the mouth size is less than 10 cm in the state of progressing to the feature point B3, the process proceeds to the feature point C2 of a next step Lv5, and if it is determined that the mouth size is greater than 10 cm in the state of progressing to the feature point B3, it is determined in the next step Lv5 that the driver's emotion is "tiredness CL2," and the process is terminated.

Further, in a case where the feature point C2 indicates whether or not the heart rate is greater than 100 beats per minute, if the heart rate is less than 100 beats per minute in the state of progressing to the feature point C2, the controller 120 may determine at a next step Lv6 that the driver's emotion is "serenity CL3," and if the heart rate is greater than 100 beats per minute in the state of progressing to the feature point C2, the controller 120 may determine in the next step Lv6 that the drivers emotion is "tension CL4."

A detailed description of the remaining feature points (A3-A4, B2-B4, C1, C3, and D1-D3) and examples of emotions will be omitted.

Each of the feature points (A1-A4, B1-B4, C1-C3, and D1-D3) may be grouped with the criteria for classifying biometric information different from each other. For example, as shown in FIG. 4, the group of the feature points A1 to A4 including the same letter A may be a group of feature points for the driver's "voice data," the group of the feature points B1 to B4 including the same letter B may be a group of feature points for the driver's "image data," the group of the feature points C1 to C3 including the same letter C may be a group of feature points for the driver's "heartbeat information," and the group of the feature points D1 to D3 including the same letter D may be a group of feature points for the driver's "body temperature information," but the present disclosure is not necessarily limited thereto.

In FIG. 4, a data structure including the four emotion values (CL1-CL4) has been described as an example, but the number of emotion values is not limited thereto. In addition, the number of feature points is not limited to that shown in FIG. 4.

On the other hand, the route that travels on the data structure to result in any one emotion value is not limited to one. Referring to FIG. 4, as the routes in which the emotion of "anger CL1" is determined, there may be a first route leading to A1→B1→A2→CL1, a second route leading to A1→B1→B2→D1→CL1, a third route leading to A1→B1→B2→A3→A4→C3→CL1, a fourth route leading to A1→B1→B2→D1→B4→D3→CL1, and a fifth route leading to A1→C1→CL1.

Herein, the number of steps of each route may be the same or different. The first route proceeds up to the fourth step Lv4, the second route proceeds up to the fifth step Lv5, the third route proceeds up to a seventh step Lv7, and the fourth route proceeds up to the third step Lv3.

In a case where a plurality of different biometric information groups (in1, in2, . . . , inn) corresponding to "anger CL1" are input to the biometric device, the first route has an accuracy value of 60% when 60% of the input biometric information groups (in1, in2, . . . , inn) proceed to the first route, the second route has an accuracy value of 15% when 15% of the input biometric information groups (in1, in2, . . . , inn) proceed to the second route, the third route has an accuracy value of 2% when 2% of the input biometric information groups (in1, in2, . . . , inn) proceed to the third route, the fourth route has an accuracy value of 4% when 4% of the input biometric information groups (in1, in2, . . . , inn) proceed to the fourth route, and the fifth route has an accuracy value of 12% when 12% of the input biometric information groups (in1, in2, . . . , inn) proceed to the fifth route.

The accuracy value of each route may be obtained experimentally and stored in advance in the controller 120.

As the controller 120 goes through many steps (Lv) on the data structure to determine a driver's emotion, the time required to process the data becomes longer, and thus the controller 120 according to an embodiment rearranges a pre-stored data structure and stores a rearranged data structure to shorten the time required.

Specifically, when the input device 110 receives a setting value for rearranging the data structure, the controller 120 may rearrange the data structure based on the setting value input through the input device 110.

More specifically, when the input device 110 receives a target emotion and an accuracy expectation value of the target emotion, the controller 120 determines a minimum step of the data structure capable of securing an accuracy value as much as an accuracy expectation value of the target emotion.

Figure 5:
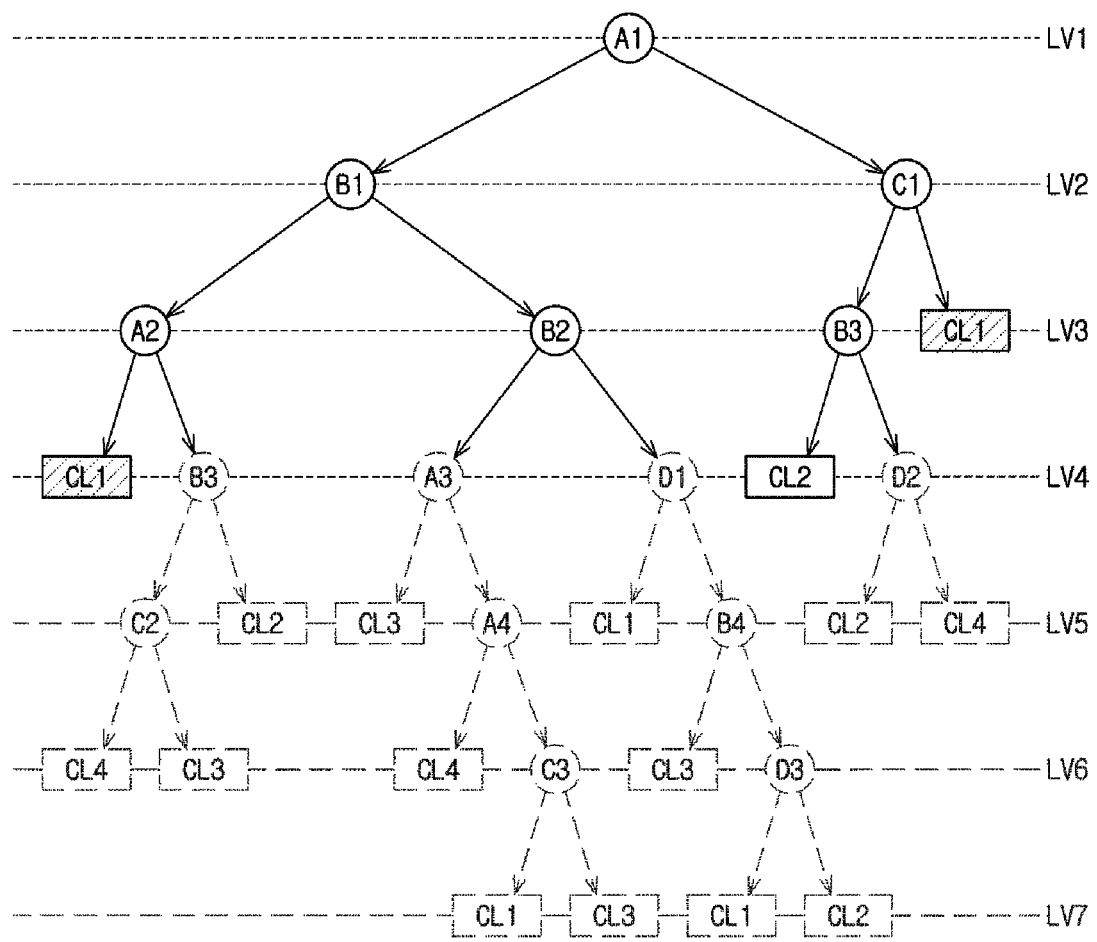
FIGS. 5 and 6 are diagrams for explaining the rearrangement process of the data structure.
Figure 6:
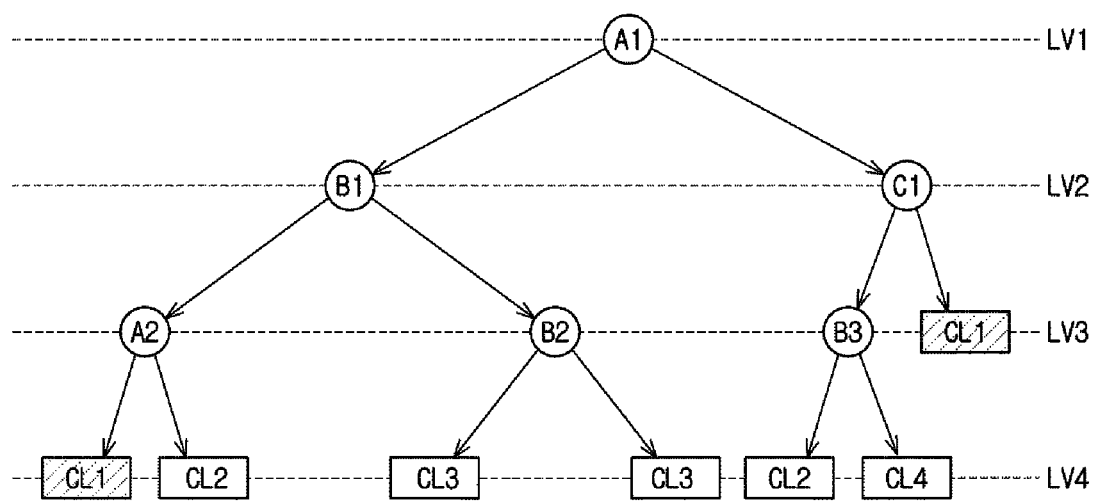

FIGS. 5 and 6 are diagrams for explaining the rearrangement process of the data structure.

For example, referring to FIG. 5, when the input device 110 inputs "anger CL1" as a target emotion and "85%" as an expectation value of the target emotion, the controller 120 first confirms whether or not "anger CL1" may be determined by proceeding to the first step Lv1, and proceeds to the second step Lv2, which is the next step, because "anger CL1" cannot be determined.

Next, the controller 120 confirms whether or not "anger CL1" may be determined by proceeding to the second step Lv2, and proceeds to the third step Lv3, which is the next step, because "anger CL1" cannot be determined.

Next, the controller 120 confirms whether or not "anger CL1" may be determined by proceeding to the third step Lv3, and confirms the accuracy value of the fifth route because "anger CL1" may be determined through the fifth route that passes through A1 and C1 Further, the controller 120 determines whether the accuracy value of the fifth route is equal to or greater than the expectation value. If the accuracy value of the fifth route is equal to or greater than the expectation value, it is determined that the third step Lv3 is the minimum step of the data structure capable of securing the accuracy value as much as the accuracy expectation value of the target emotion, but if the accuracy value of the fifth route is less than the expectation value, the process proceeds to the fourth step Lv4 which is the next step.

Herein, since the accuracy value of the fifth route is 12% which is less than the expectation value (85%), the controller 120 proceeds to the fourth step Lv4.

Next, the controller 120 confirms whether or not "anger CL1" may be determined in the fourth step Lv4, and confirms the accuracy value (60%) of the first route because "anger CL1" may be determined through the first route that passes through A1, B1 and A2. Further, the controller 120 sums the sum of the accuracy values of "anger CL1" that may be determined when the process has proceeded up to the previous step (the third step Lv3) and the sum of the accuracy values of "anger CL1" that may be determined in the fourth step Lv4, which is the current step, and determines whether the summed accuracy value is equal to or greater than the expectation value. Further, if the summed accuracy value is equal to or greater than the expectation value, the controller 120 determines that the fourth step Lv4, which is the current step, is the minimum step of the data structure capable of securing the accuracy value as much as the accuracy expectation value of the target emotion, but if the summed accuracy value is less than the expectation value, the process proceeds to the fifth step Lv5 which is the next step.

In FIG. 5, the sum of the accuracy values of "anger CL1" that may be determined when the process has proceeded up to the previous step (the third step Lv3) is 15%, the sum of the accuracy values that may be determined in the fourth step Lv4, which is the current step, is 70%, which is the accuracy value of the first route, and when these are summed up, it becomes 85%. Therefore, the controller 120 may determine that the fourth step Lv4 is the minimum step of the data structure capable of securing the accuracy value as much as the accuracy expectation value of the target emotion.

Referring to FIG. 5, when the minimum step is determined, the controller 120 may rearrange the data structure based on the minimum step. That is, one or more feature points existing at the minimum step and after the minimum step and one or more emotion values existing after the minimum step may be deleted.

On the data structure of FIG. 5, the controller 120 may delete one or more feature points existing on the fourth step Lv4 to the seventh step Lv7 and one or more emotion values existing on the fifth step Lv5 to the seventh step Lv7.

Further, referring to FIG. 6, the controller 120 may select a representative emotion value for one or more feature points that have been present in the minimum step.

For example, in order to select a representative emotion value for the B3 feature point that have been present in the fourth step Lv4, which is the minimum step, the controller 120 may determine the emotion values (CL2, CL3, and CL4) branched from the B3 feature point, and may calculate the accuracy values of the routes proceeding to the respective emotion values (CL2, CL3, and CL4), respectively. Further, the emotion value (any one of CL2, CL3, and CL4) proceeding to the route having the largest accuracy value may be selected as the representative emotion value of the B3 feature point.

Specifically, in a case where the accuracy value of the route that is branched from the B3 feature point of the fourth step Lv4 and proceeds to CL2 is 20%, the accuracy value of the route that finally proceeds to CL3 is 15%, and the accuracy value of the route that finally proceeds to CL4 is 10%, the controller 120 may select CL2 that proceeds to the route having the largest accuracy value as the representative emotion value of the B3 feature point located in the fourth step Lv4.

As another example, in order to select the representative emotion value for the A3 feature point of the deleted fourth step Lv4, the controller 120 may determine the emotion values (CL3, CL4, and CL1) branched from the A3 feature point, and may calculate the accuracy values of the routes proceeding to the respective emotion values (CL3, CL4, and CL1), respectively. Further, the emotion value (any one of CL3, CL4, and CL1) proceeding to the route having the largest accuracy value may be selected as the representative emotion value of the A3 feature point.

Specifically, in a case where the accuracy value of the route that is branched from the A3 feature point of the fourth step Lv4 and proceeds to CL3 is 50%, the accuracy value of the route that finally proceeds to CL4 is 15%, and the accuracy value of the route that finally proceeds to CL1 is 17%, the controller 120 may select CL3 that proceeds to the route having the largest accuracy value as the representative emotion value of the A3 feature point located in the fourth step Lv4.

Likewise, the method of selecting the representative emotion values for the D1 feature point and the D2 feature point of the remaining fourth step Lv4, which is deleted, is the same, and redundant description will be omitted.

When the controller 120 rearranges the data structure, since the accuracy value equal to or more than the expectation value (85%) may be ensured for "anger CL1" which is the target emotion even if the driver's emotion is determined using the data structure that is rearranged in the future, it is not necessary to perform more than four steps to determine the emotion, and it is possible to increase the data processing speed.

The input device 110 may also receive a plurality of the target emotions, and an accuracy expectation value of each of the target emotions.

In this case, the controller 120 may determine the minimum step of the data structure that can satisfy all the accuracy expectation values for the plurality of target emotions.

For example, in a case where the input device 110 receives "anger CL1" and "sorrow CL2" as the target emotions, receives 85% as an accuracy expectation value for "anger CL1," and receives 50% as an accuracy expectation value for "sorrow CL2," the controller 120 may determine the minimum step of the data structure capable of ensuring an accuracy value of 50% or more for "sorrow CL2" while securing an accuracy value of 85% or more for "anger CL1." Further, the controller 120 may rearrange the data structure based on the determined minimum step of the data structure and may determine the driver's emotion based on the rearranged data structure.

Since the method of rearranging the data structure has been described above, a description thereof will be omitted.

The data structure rearranged as described above may be displayed by a display device (not shown) separately provided in the vehicle 10 or a display unit (not shown) further included in the data classification apparatus 100.

The display device or the display unit may be provided as a cathode ray tube (CRT), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel or an organic light emitting diode (OLED) panel, but the present disclosure is not limited thereto.

Some of the components of the vehicle 10 described above may be software and/or hardware components such as Field Programmable Gate Arrays (FPGAs) and Application Specific Integrated Circuits (ASICs).

Hereinafter, a control method of the data classification device 100 included in the vehicle 10 will be described with reference to FIG. 7.

Figure 7:
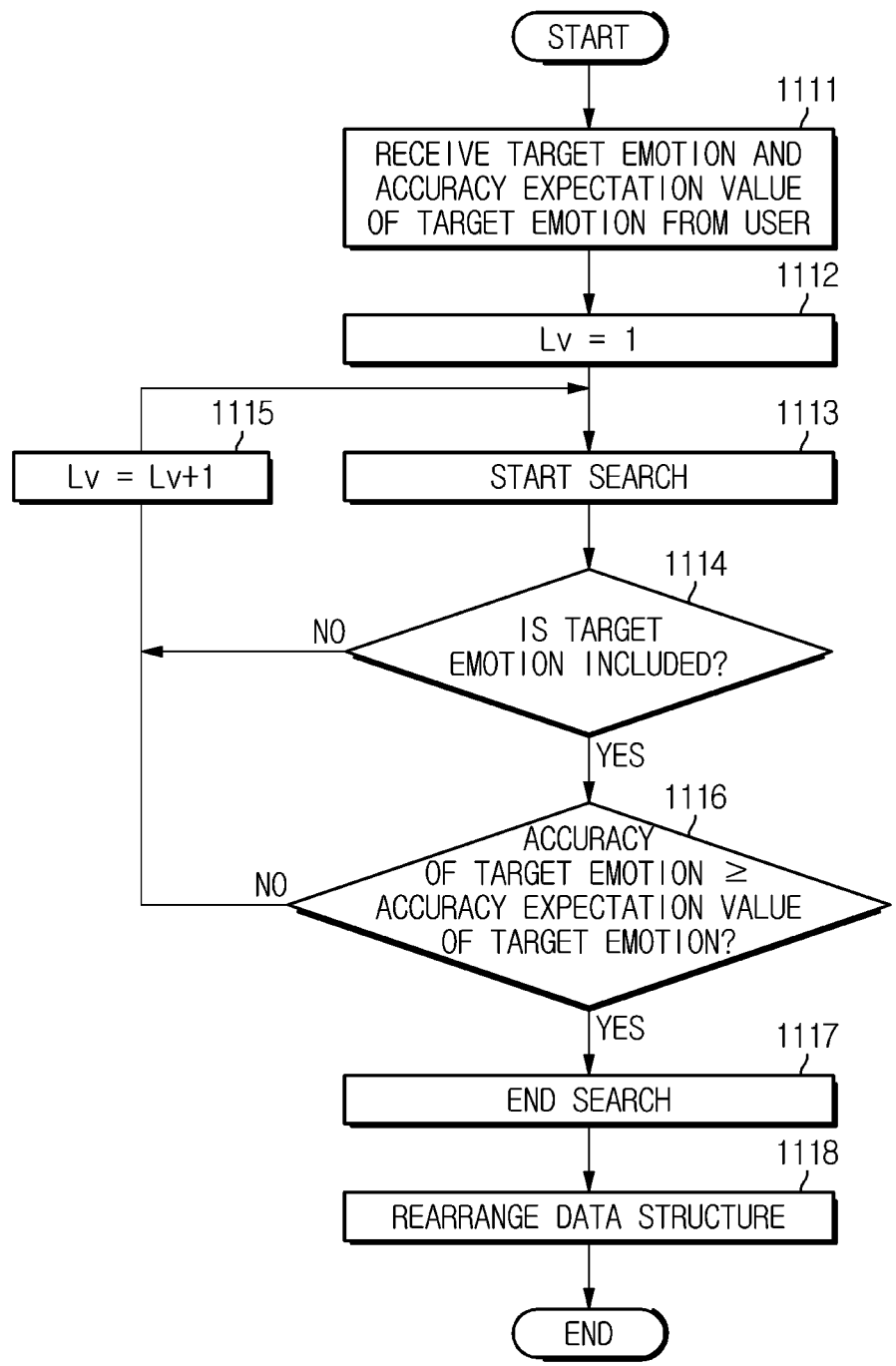
FIG. 7 is a flowchart of a control method of a data classification apparatus according to an embodiment of the present disclosure.

FIG. 7 is a flowchart of a control method of the data classification apparatus according to an embodiment of the present disclosure.

First, the data classification apparatus 100 receives a target emotion and an accuracy expectation value of the target emotion (1111).

Receiving the target emotion and the accuracy expectation value of the target emotion may include receiving a plurality of the target emotions and the accuracy expectation value of each of the target emotions.

Next, the data classification apparatus 100 starts searching from the first step or a search step Lv1 of the data structure stored in advance (1112 and 1113) and determines whether or not the inputted target emotion is included in the search step Lv1 (1114), and compares the accuracy value of the target emotion located at the search step Lv1 with the accuracy expectation value of the inputted target emotion when included in the search step Lv1 (1116).

The data classification apparatus 100 may compare the sum of the accuracy values of the plurality of target emotions located in the search step Lv1 with the accuracy expectation of the inputted target emotion when there is the plurality of target emotions in the search step Lv1.

Further, if the accuracy value of the target emotion is equal to or greater than the accuracy expectation value of the inputted target emotion ("YES" in 1116), the data classification apparatus 100 ends the search (1117), and rearranges the data structure by deleting one or more feature points existing at the search step Lv1 and after the search step Lv1 and one or more emotion values existing after the search step Lv1 and selecting the representative emotion value of the feature point that has existed in the search step Lv1 (1118).

However, if there is no target emotion in the search step Lv1 ("No" in 1114) or the accuracy value of the target emotion existing in the search step Lv1 is less than the accuracy expectation value of the target emotion ("No" in 1116), the data classification apparatus 100 proceeds to search for the next step Lv2 (1115).

Further, as described above, the data classification apparatus 100 may determine whether or not the inputted target emotion is included in a newly proceeded search step Lv2 (1114), compare the accuracy value of the target emotion located in the search step Lv2 with the accuracy expectation value of the inputted target emotion when included in the search step Lv2 (1116), proceed with the search until the accuracy value of the target emotion exceeds the accuracy expectation value of the target emotion, and rearrange the data structure by selecting a representative emotion value at a minimum step where the accuracy value of the target emotion is equal to or greater than the accuracy expectation value of the target emotion.

Further, the data classification apparatus 100 may quickly determine the driver's emotion based on the biometric information of the driver input to the biometric device using the rearranged data structure.

As is apparent from the above, using the data structure generated by the data classification apparatus according to one aspect of the present disclosure, the vehicle including the same, and the control method of the same, a driver's emotion can be quickly determined based on the biometric information of the driver.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a ROM (Read Only Memory), a RAM (Random Access Memory), a magnetic tape, a magnetic disk, a flash memory, an optical data storage device, and the like.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A data classification apparatus comprising:
    an input device in which a target emotion and an accuracy expectation value of the target emotion are inputted; and
    a controller rearranging a pre-stored data structure based on the target emotion and the accuracy expectation value of the target emotion,
    wherein the controller includes at least one processor and at least one of non-transitory memory or transitory memory storing software instructions executed by the at least one processor,
    wherein the controller rearranges the data structure, where an accuracy value of the target emotion is secured as much as the accuracy expectation value, and
    wherein the controller determines a minimum step of the data structure satisfying the accuracy expectation value of the target emotion, deletes a feature point of the data structure existing at the minimum step and existing after the minimum step and an emotion value of the data structure existing after the minimum step, selects a representative emotion value of the deleted feature point of the minimum step, and rearranges the data structure based on the representative emotion value.

2. The data classification apparatus according to claim 1, wherein the input device receives a plurality of target emotions and an accuracy expectation value of each of the target emotions, and
    the controller determines a minimum step of the data structure satisfying the accuracy expectation values of the plurality of target emotions and rearranges the data structure based on the determined minimum step.

3. The data classification apparatus according to claim 1, wherein the controller determines accuracy values of one or more routes proceeding to the target emotion in the data structure and rearranges the data structure based on a minimum step of the route in which an accuracy value among the accuracy values of the one or more routes is equal to or greater than the accuracy expectation value.

4. The data classification apparatus according to claim 1, wherein the controller determines accuracy values of a plurality of routes proceeding to the target emotion in the data structure, respectively, determines a minimum step necessary for proceeding to a plurality of routes to the target emotion in which the sum of the accuracy values is equal to or greater than the accuracy expectation value, and rearranges the data structure based on the minimum step.

5. The data classification apparatus according to claim 1, wherein in order to select the representative emotion value, the controller determines one or more emotion values branched from the feature point of the deleted minimum step, calculates the accuracy values of the plurality of routes proceeding to the respective emotion values, respectively, and selects the emotion value proceeding to the route having a largest accuracy value among the calculated accuracy values as a representative emotion value.

6. The data classification apparatus according to claim 1, further comprising a display device displaying the rearranged data structure.

7. A vehicle comprising:
a biometric device in which biometric information of a driver is inputted; and
a data classification apparatus including an input device in which a target emotion and an accuracy expectation value of the target emotion are inputted, and a controller which rearranges a pre-stored data structure based on the target emotion and the accuracy expectation value of the target emotion,
wherein the controller includes at least one processor and at least one non-transitory memory storing software instructions executed by the at least one processor,
wherein the controller rearranges the data structure, where an accuracy value of the target emotion is secured as much as the accuracy expectation value, and determines the emotion of the driver corresponding to the biometric information using the rearranged data structure, and
wherein the controller determines a minimum step of the data structure satisfying the accuracy expectation value of the target emotion, deletes a feature point of the data structure existing at the minimum step and existing after the minimum step and an emotion value of the data structure existing after the minimum step, selects a representative emotion value of the deleted feature point of the minimum step, and rearranges the data structure based on the representative emotion value.

8. The vehicle according to claim 7, wherein the controller receives a plurality of target emotions and an accuracy expectation value of each of the target emotions, determines a minimum step of the data structure satisfying the accuracy expectation values of the plurality of target emotions, and rearranges the data structure based on the minimum step.

9. The vehicle according to claim 7, wherein the controller determines accuracy values of one or more routes proceeding to the target emotion in the data structure, and rearranges the data structure based on a minimum step of the route in which an accuracy value among the accuracy values of the one or more routes is equal to or greater than the accuracy expectation value.

10. The vehicle according to claim 7, wherein the controller determines accuracy values of a plurality of routes proceeding to the target emotion in the data structure, respectively, determines a minimum step necessary for proceeding to a plurality of routes to the target emotion in which the sum of the accuracy values is equal to or greater than the accuracy expectation value, and rearranges the data structure based on the minimum step.

11. The vehicle according to claim 7, wherein in order to select the representative emotion value, the controller determines one or more emotion values branched from the feature point of the deleted minimum step, calculates the accuracy values of the routes proceeding to the respective emotion values, respectively, and selects the emotion value proceeding to the route having a largest accuracy value among the calculated accuracy values as a representative emotion value.

12. The vehicle according to claim 7, further comprising a display device displaying the rearranged data structure.

13. A control method of a data classification apparatus comprising steps of:
receiving, by an input device, a target emotion and an accuracy expectation value of the target emotion; and
rearranging, by a controller, a pre-stored data structure based on the target emotion and the accuracy expectation value of the target emotion,
wherein the controller includes at least one processor and at least one non-transitory memory storing software instructions executed by the at least one processor,
wherein in the step of rearranging the pre-stored data structure, the controller rearranges the data structure, where an accuracy value of the target emotion is secured as much as the accuracy expectation value, and
wherein the step of rearranging the pre-stored data structure includes:
determining, by the controller, a minimum step of the data structure satisfying the accuracy expectation value of the target emotion;
deleting, by the controller, a feature point of the data structure existing at the minimum step and existing after the minimum step and an emotion value of the data structure existing after the minimum step;
selecting, by the controller, a representative emotion value of the deleted feature point of the minimum step; and
rearranging, by the controller, the data structure based on the representative emotion value.

14. The control method of a data classification apparatus according to claim 13, wherein the step of rearranging the pre-stored data structure further includes:
determining, by the controller, accuracy values of one or more routes proceeding to the target emotion in the data structure; and
rearranging, by the controller, the data structure based on a minimum step of the route in which an accuracy value among the accuracy values of the one or more routes is equal to or greater than the accuracy expectation value.

* * * * *